US006693139B2

(12) United States Patent
Bachman et al.

(10) Patent No.: US 6,693,139 B2
(45) Date of Patent: Feb. 17, 2004

(54) TREATED ION EXCHANGE RESIN AND METHOD FOR TREATMENT THEREOF

(75) Inventors: Gregory W. Bachman, Caledonia, IL (US); Robert G. Loken, Rockford, IL (US); Julie G. Sterling, Pecatonica, IL (US); Thomas K. Mallmann, Rockford, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/947,935

(22) Filed: Sep. 6, 2001

(65) Prior Publication Data

US 2003/0050350 A1 Mar. 13, 2003

(51) Int. Cl.$^7$ ................................................. C08J 5/20
(52) U.S. Cl. ................................................ 521/26; 521/28
(58) Field of Search ...................................... 521/26, 28

(56) References Cited

U.S. PATENT DOCUMENTS

| | | | |
|---|---|---|---|
| 2,961,417 A | * | 11/1960 | Small |
| 4,028,234 A | | 6/1977 | Katzakian, Jr. et al. |
| 4,151,079 A | * | 4/1979 | Horembala .................... 210/32 |
| 4,664,811 A | * | 5/1987 | Operhofer .................... 210/673 |
| 4,753,736 A | * | 6/1988 | Reichgott .................... 210/672 |
| 4,820,421 A | | 4/1989 | Auerswald |
| 5,124,362 A | * | 6/1992 | Auerswald .................... 521/26 |
| 5,292,439 A | | 3/1994 | Morita et al. |
| 5,389,261 A | | 2/1995 | Daly et al. |
| 6,248,797 B1 | | 6/2001 | Dias et al. |

OTHER PUBLICATIONS

Bates, J.C., "The Ion Exchange Behaviour of Selected Volatile Amines," EPRI Meeting, May 31, 1989, Little Rock, Arkansas.
Crone, L. E., "Experience with Boric Acid Treatment and Condensate Polishing at Millstone 2," EPRI Meeting, May 30, 1989, Little Rock, Arkansas.
Flores, O., "Tailored Amine Injection Project," EPRI Meeting, Sep. 1, 1998, Huntington Beach, CA.
Gmurczy, M. U., et al., "Qualification Studies of Alternate Amines for the Secondary System at Indian Point 2," EPRI Meeting, Sep. 1, 1998, Huntington Beach, CA.
Harvey, S., et al., "Ion Exchange Performance During Startup at TVA's Watts Bar Nuclear Plant," EPRI Meeting, Sep. 15, 1997, New Orleans, LA.
Tarbert, R. E., "Toxicologic, Pharmacologic, and Environmental Considerations Impacting the Use of Amines in Steam Electric Plants," EPRI Meeting, Sep. 25, 1990, Tampa, FL.
Auerswald, D., et al., "Design and Performance of the Condensate Polishing System at San Onofre Nuclear Generating Station," SCI Meeting on Ultrapure Water, Mar. 25, 1986, University of Bristol, Bristol, United Kingdom.

Stahlbush, J. R., et al., "Prediction and Identification of Leachables from Cation Exchange Resins," 48$^{th}$ Annual Meeting, International Water Conference, Nov. 1987, Pittsburgh, Pennsylvania.
Kemmer, F. N., "Current Trends in Condensate Treatment," Power, May 1964, McGraw–Hill, Inc., Chicago, Illinois.
Strauss, S. D., "Design Operating Improvements Focus on Condensate Polishing," Power, May 1992, pp. 39–40, 42, 46, 50, 52, 56, 60, 62, 64, 66–67.
Hamann, H., et al., "Mixed Bed Capacity at Condensate Conditions," 57$^{th}$ Annual Meeting, International Water Conference, Oct. 1996, Pittsburgh, Pennsylvania.
Hillman, R. J., et al., "Sulfate from a Salt Water Condenser Leak at Oyster Creek Nuclear Generating Station," 2000 EPRI Workshop on Condensate Polishing, Jun. 2000, Annapolis, Maryland.
Nellis, B., et al., "Resin Improvements for Sulfate Reduction at Lasalle," EPRI Condensate Polishing Workshop, May 1996, San Antonio, Texas.
"Pilgrim Experience with Resin Ingress," EPRI PWR/BWR Plant Chemistry Meeting, Jan. 2001, San Antonio, Texas.
Gelosa, L. R., et al., "Latest Chemical Treatment," Power, Jan. 1979, pp. 78–81.
McNulty, J. T., et al., "Anion Exchange Resin Kinetic Testing an Indispensable Diagnostic Tool for Condensate Polisher Troubleshooting," 47$^{th}$ Annual Meeting International Water Conference, Oct. 1986, Pittsburgh, Pennsylvania.
Kunin, R., "Selection of Cation Exchange Resins for Condensate Polishing with Amines—Kinetics Versus Equilibrium," EPRI Use of Amines in Conditioning Steam/Water Cycles Workshop, Sep. 1990, Tampa, Florida.
Rootham, M., "Secondary System Chemistry Control and Ion Exchange for Today and Tomorrow," EPRI Condensate Polishing Workshop, Mar. 1995, Seattle, Washington.
Kennedy, C. M., et al., "Experience with High Rate Ammoniated Mixed Beds for Condensate Polishing at Cipsco, Coffeen Station," 28$^{th}$ Annual International Water Conference, Dec. 13, 1967, Pittsburgh, Pennsylvania.
Martin, R. A., "Characterization of Demineralizer Performance Operating with MPA versus ETA," EPRI Workshop on Condensate Polishing and Water Purification in the Steam Cycle, May 1996, San Antonio, Texas.

(List continued on next page.)

Primary Examiner—Bernard Lipman
(74) Attorney, Agent, or Firm—Lowrie, Lando & Anastasi, LLP (57) ABSTRACT

This invention relates to ion exchange resins that have a reduced amount of physically adsorbed organic compounds, as well as methods of producing and using such resins. In particular, the amount of extractable total organic carbon on the resins may be less than about 200 parts per trillion by wet weight, as measured using gas chromatography/mass spectrometry. This invention also relates to methods of treating water that use such resins.

20 Claims, 2 Drawing Sheets

OTHER PUBLICATIONS

Schults, G. L., "Condensate Polishing Issues at Callaway Plant," Condensate Polisher Workshop, Jun. 28, 2000, Annapolis, Maryland.

Park, K. K., et al., "Full–Scale Test of ETA chem. and Assessment of the CPP at KORI Unit 1," EPRI on Condensate Polishing Workshop, Jun. 2000, Annapolis, Maryland.

McCoy, M., et al., "Cation Resin Degradation in Certain Amine Forms," EPRI Condensate Polishing Workshop, Sep. 1997, New Orleans, Louisiana.

Fisher, S., et al., "Kinetics Testing of PWR Condensate Resins Operating on Ethanolamine," EPRI Workshop Condensate Polishing and Water Purification in the Steam Cycle, Mar. 1995, Seattle, Wasington.

Worley, D., "Condensate Polishing Experience with Morpholine Chemistry in a Once Through Steam Generator Steam Cycle," EPRI Workshop on Use of Amines in Conditioning Steam/Water Cycles, Sep. 1990, Tampa, Florida.

Ebach, E. A., "Amine–Form Cation Exchange Resin Studies," EPRI Amine Workshop, Sep. 1990, Tampa, Florida.

Bates, J., et al., "Preliminary Results of MPA Usage at Byron Unit 2," EPRI Condensate Polisher Workshop, Mar. 1995, Seattle, Washington.

Fisher, S., "The Fate of the Anion in Systems with Amines," EPRI Workshop Use of Amines in Conditioning Steam/Water Cycles, Sep. 1990, Tampa, Florida.

Sawochka, S. G., "Morpholine Gains Interest in Search for Improved Reliability of PWR Steam Generators," Apr. 1998, Power, pp. 67–70.

Hepp, D., et al., "Evaluate Amine Capability for Condenser Protection," Sep. 1987, Power, pp. 67–70.

Alexander, L. B., "Corrosion Product Transport in Byron Secondary Cycle with Morpholine," EPRI Use of Amines in Conditioning Steam/Water Cycles Workshop, Sep. 1990, Tampa, Florida.

Nordmann, F., et al., "Comparison of Morpholine to Ammonia Treatment for All Ferrous Systems," EPRI Use of Amines in Conditioning Steam/Water Cycles Workshop, Sep. 1990, Tampa, Florida.

Sadler, A. M., "Acetates from Morpholine: Thoughts on Possible Problems in the Steam–Water Circuit," EPRI Workshop The Use of Amines in Conditioning Steam–Water Cycles, Sep. 1990, Tampa, Florida.

Lurie, S. W., "C–e NSSS Experience With Alternate Amine Chemistry," EPRI/FPC Workshop on Use of Amines in Conditioning Steam/Water Cycles, Sep. 1990, Tampa, Florida.

Robbins, P., "Experience with Morpholine and Deep Bed Polishers at ANO–1," EPRI Use of Amines in Conditioning Steam/Water Cycles Workshop, Sep. 1990, Tampa, Florida.

Warley, D., Condensate Polishing Experience with Morpholine Chemistry in Once Through Steam Generator Steam Cycle, EPRI Workshop on Use of Amines in Conditioning Steam/Water Cycles, Sep. 1990, Tampa, Florida.

Auerswald, D., et al., "Design and Performance of the Condensate Polishing System at San Onofre Nuclear Generating Station," SCI Meeting on Ultrapure Water, Mar. 25, 1986, University of Bristol, Bristol, United Kingdom.

Ball, M., et al., "Ammonium Form Cation Resin Operation of Condensate Purification Plant," Ion Exchange Technology, 1984, p. 106–118.

Bates, J.C., "Morpholine Experience at Oldbury Power Station," The International Conference on the Development and Use of Ion Exchange for Industry, 1998, Cambridge.

Bevan, C. A., et al., "Evaluating Deep Bed Condensate Polisher Performance for PWRs Using Morpholine," Electric Power Research Institute, Condensate Polishing Workshop, 1989, Little Rock, Arkansas.

Down, P. E., "Condensate Polishing Process," Liberty Bell Corrosion Course, 1984.

Ebach, E. A., "Considerations in the Use of Resins in CP Morpholine Service," EPRI $8^{th}$ Condensate Polishing Workshop, 1989, Little Rock, Arkansas.

Fellers, B. D., et al., "Pre–Morpholated Demineralizer Systems Nuclear Power Plant Experience," $55^{th}$ Annual International Water Conference, 1996.

Fisher, S., et al., "The Sulfate Problem: What Happens if the Resins Just Sit?" International Water Conference, 2001.

Fountain, M. J., et al., "The Effects of Amines on Ion–Exchange Resins," EPRI Workshop: The Use of Amines in Conditioning Steam/Water Cycles, 1990, Tampa, Florida.

Fountain, M. J., et al., "The Use of AMP and Other Amines to Control Erosion–Corrosion in Magnox Boilers," EPRI Workshop The Use of Amines in Conditioning Steam/Water Cycles, 1990, Tampa, Florida.

Gillespie, R., "Experience with Deep Beds and Morpholine at ANO–1," EPRI Condensate Polishing Workshop, 1989, Little Rock, Arkansas.

Igarishi, H. et al., "Evaluation of leachable behavior from ion exchange resins. Effects of organic impurities on BWR water chemistry", Journal of Nuclear Science and Technology, May 5, 1999, vol. 36, No. 5, pp. 443–450.

Ito, T., et al., "A Quantum Leap in CPP Ion Exchange Resin Technology," International Water Conference, 2001.

Keeling, D., et al., "Effects on Ethanolamine on Polisher Resins and Polisher Operation," International Water Conference, 1994.

Kristensen, J. E., et al., "Optimization of Condensate Polisher Operation with Boric Acid and Morpholine," Condensate Polisher Workshop for Deep Bed Purification System, 1989, Little Rock, Arkansas.

Kristensen, J. E., "Condensate Polisher Operation with Boric Acid and Morpholine," Electric Power Research Institute Condensate Polishing Workshop, 1990, Tampa, Florida.

Murray, W. F., et al., "Improved Water Chemistry at Virginia Power's Surry Station," International Water Conference, 1995.

Quan, R., "Experience with Morpholine and Ammonia Addition Used in the Secondary System of Point Lepreau GS," EPRI Eighth Workshop on Condensate Polishing and Water Purification in the Steam Cycle.

Wilson, D., "Experience with Boric Acid Mopholine at Indian Pont Unit III," EPRI Condensate Polishing Workshop, 1990, Tampa, Florida.

Wirth, L. F., "Ammonia, Amines and Boric Acid: Their Effects on PWR Ion Exchange Systems," Workshop on Condensate Polishing and Water Purification in the Steam Cycle, 1989, Little Rock, Arkansas.

\* cited by examiner

TREATED ION EXCHANGE RESIN AND METHOD FOR TREATMENT THEREOF

BACKGROUND

1. Field of the Invention

This invention relates to ion exchange resins and, in particular, to ion exchange resins having reduced extractable organic compounds and methods of producing such resins.

2. Description of the Related Art

Ion exchange is a process that exchanges one ion in solution for another ion that is bound to a substrate. Typically, the ion in solution has a higher affinity for the substrate than the bound one. The ion in solution adsorbs onto the substrate, displacing ("exchanging") the bound ion into solution.

Ion exchange is often used in water treatment, where ions in aqueous solution typically displace hydrogen ($H^+$) or hydroxide ($OH^-$) ions bound to a substrate. This is sometimes known as "water demineralization" or "water deionization." The substrate, such as a resin, is conventionally made from a polymeric material or a zeolite. The ions are exchanged stoichiometrically, maintaining electroneutrality of the system. A resin that exchanges one positive ion (or a proportionate quantity based on valency), such as hydrogen, for another positive ion, such as copper, iron, or sodium, is a cation resin; a resin that exchanges one negative ion (or a proportionate quantity based on valency), such as hydroxide, for another negative ion, such as chloride, sulfate, or chromate, is an anion resin. In many cases, both types of resins are used to remove various salts, such as sodium chloride or calcium sulfate, from solution. The resin may be used until it becomes saturated with the ions being removed; however, many resins may also be regenerated and reused. For example, resins used in water treatment may be regenerated by using strong acids (cation resins) or strong bases (anion resins).

Ion exchange columns or beds containing resins are commonly used in industries where purity of water may be important. Ion exchange columns are especially important in industries with closed-loop circulation systems, such as those used in cooling equipment, where ion concentrations may increase to high levels because of the lack of an outlet for ions leaching from the surrounding piping and equipment. Ion exchange columns also see use in industries with high purity water requirements, such as in semiconductor manufacturing, or condensate polishing in the nuclear power industry.

SUMMARY

The present invention provides an ion exchange resin material. The resin is treated so that it comprises less than 200 parts per trillion by wet weight of adsorbed total organic carbon extractables, as determined by a gas chromatography/mass spectrometry test.

In another embodiment, the present invention provides a method of treating an ion exchange resin material. A resin is provided and contacted with an organic solution to produce a resin with less than about 200 parts per trillion by wet weight of adsorbed total organic carbon extractables, as determined by a gas chromatography/mass spectrometry test.

In another embodiment, the present invention provides a method of maintaining an ion concentration in a solution. The solution comprises an ethanolamine buffer. The solution is passed over an ion exchange resin material for a total period of usage greater than about three months. During such time, the ion concentration in solution remains below about 100 parts per trillion, as determined by gas chromatography/mass spectrometry test.

In another embodiment, the present invention provides a method of treating an ion exchange resin material. An ion exchange resin material is provided and contacted with a solution comprising a first concentration of an amine. The resin material is then contacted with a solution comprising a second concentration of an amine.

In another embodiment, the present invention provides a method of treating an ion exchange resin material. A resin material is provided and contacted with water at a temperature greater than about 130° F. The material is also contacted with a solution comprising ethanolamine. The material is also contacted with a solution comprising a mineral acid.

In another embodiment, the present invention provides a mixed ion exchange resin. The mixed ion exchange resin comprises a first ion exchange resin material comprising less than about 200 parts per trillion by wet weight of adsorbed total organic carbon extractables as determined by a gas chromatography/mass spectrometry test, and a second ion exchange resin material.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Preferred, non-limiting embodiments of the present invention will be described by way of example with reference to the accompanying drawings.

DETAILED DESCRIPTION

This invention relates to ion exchange resins that have a reduced amount of physically adsorbed organic compounds, as well as methods of producing and using such resins. In particular, the amount of total organic carbon ("TOC") extractables on the resins may be less than about 200 parts per trillion by wet weight (abbreviated herein as "ppt"), as measured using a gas chromatography/mass spectrometry system ("GC/MS"). An acceptable GC/MS measurement may be performed on a Hewlett Packard G1800A instrument equipped with 30 m×0.25 mm HP5 column (Crosslinked 5% PHME silicone). The temperature program used may be an initial hold of 2 min at 70° C., a ramp of 5° C./min to 250° C., and a final hold of 25 min. The helium flow rate may be 1 ml/min and the injection port may be set at 250° C. The mass spectra may be collected over the range 45–450 amu after a solvent delay of 4 minutes. The TOC is defined herein to be the ratio of the mass of all of the compounds adsorbed to the resin that comprise carbon and are chemically extractable ("extractables") from the resin, divided by the overall mass of the resin, as measured using a gas chromatography/mass spectrometry system.

The TOC's may be adsorbed onto the outer surface of the resin, or contained within pores, channels, or other interior spaces within the resin that have surface access to the exterior. The TOC concentration of the resins may be measured by several different techniques that are well-known in the art, such as the 16 hour soak test, the dynamic TOC test, the gas chromatography/mass spectrometry test or the UV sulfate test. The TOC concentrations reported herein are on a "wet weight" basis, where the resins are in a hydrated state.

In the 16 hour soak test, a predetermined quantity of resin is immersed for 16 hours in a known volume of water maintained at a temperature of 180° F. During this time, TOC's from the resin may leach into solution. After 16 hours, the water is removed and examined for TOC content with various accepted techniques using ultraviolet ("UV") light and oxidizing chemicals. Additional testing may be employed to further verify TOC removal, such as GC/MS analysis, where various solvents are used to extract the organics, and subsequently analyzed and characterized for TOC components.

During the resin manufacturing process, several processes may give rise to relatively high TOC levels. For example, in resins comprising polymers or polymer blends, leftover unreacted monomers, by-product oligomers and polymers may remain in or on the resins, resulting in measurable amounts of TOC's after manufacturing. Alternatively, TOC's may originate from contaminants in the raw material feedstock of the resin, or from other processes. During use, relatively high amounts of TOC may cause fouling of the resin or other nearby resins, or interfere and compete with ion exchange processes. This fouling may be measured by the mass transfer coefficient ("MTC") of the resins. The amount of fouling may be measured by applying a salt challenge to the resin before or after installation or mixing of the individual resin types. In some embodiments where water is treated, the TOC's may dissolve in the water, preventing the water from being sufficiently purified. Buffers or other materials present in the water may also promote the desorption of TOC's into solution. Thus, the reduction of TOC levels in the resins after production of the resins may be desirable.

Any resin may be used as an initial component of this invention. The resins may be composed of any material or materials that bind to the specific ion or ions of interest, such as sodium ($Na^+$), chloride ($Cl^-$) or sulfate ($SO_4^{2-}$) ions. It is desirable that the resin material be easy to handle and fashion into a desired shape, particularly into a shape that may easily be put within a flowstream, such as a discrete particle or an open mesh. For example, in one set of embodiments, greater than about 75%, preferably greater than about 85%, and more preferably greater than about 95% of the resin material may be in the form of discrete particles, and they may have a nominal diameter of less than about 1.2 millimeter, preferably less than about 1 millimeter, and more preferably less than about 800 micrometers. It is also desirable that the resin material be durable. For example, the material may be subject to many hours of prolonged use. Additionally, it is desirable for the material to be durable enough to prevent significant degradation, flaking, decomposition, or release of chemicals into solution during use. It is also desirable that the resin material be able to be regenerated for reuse. It is particularly desirable that the material be able to withstand multiple rounds of regeneration without being significantly adversely affected, either chemically or physically. Examples of materials that the resin may be constructed from include polymers, copolymer blends, zeolites, silica, and the like. In embodiments where polymers are used as resins, some polymers that may be used include copolymer blends of polydivinylbenzene and polystyrene, or polydivinylbenzene and polymethylmethacrylate.

In some embodiments of the invention, the resin is composed of discrete particles, due to their ease of construction and transport, as well as their relatively high surface-to-volume ratios. However, other physical structures with similar properties may also be used, such as open mesh or porous networks. In the case of particles, it is generally preferable that the particles be of uniform shape and size. Also desirable are substantially spherical particles, free of cracks, chips, or other defects, which may result in premature breakdown and thus shorten the effective working life of the particles. Characterization of the physical properties of damaged particles may be more difficult and less predictable, as the particle distribution becomes non-uniform. Additionally, broken or damaged particles and the like may clog or damage equipment, or inhibit regeneration and reuse of the resin. In certain embodiments of the invention, preferred particles are substantially intact spherical particles with a uniformity coefficient of less than about 1.5, preferably less than about 1.3, and more preferably less than about 1.1. The uniformity coefficient may be measured in a standard particle size analyzer. The uniformity coefficient is defined herein to be the size of 40% of the retained particles, divided by the nominal or effective size of the particles. As used herein, "intact" particles refers to particles that are substantially unbroken, undamaged, and free of cracks, chips, or other defects.

For high surface-to-volume ratios, the particles may have relatively small average diameters. However, if the particle diameters are too small, the particles may become too light and difficult to work with. Particle diameters that are too small may also induce large pressure drops across particle beds, thus becoming more expensive or dangerous to work with. In some embodiments, an average particle diameter of about 500 to 1000 micrometers provides a suitable balance of these concerns, with a preferred average diameter of about 600 to 800 micrometers. However, it should be understood that the usable range of particle sizes will vary with the application of the resin. For example, in laboratory- or pilot plant-scale applications, lower pressure drops and slower flowrates across the particle beds may be desired, so that smaller diameter particles may be more advantageous; whereas in high-throughput plants, larger diameter particles may be preferred. As used here, the "average diameter" refers to the arithmetic average of the average diameter of each particle.

In other embodiments, separation of the cation and anion resins in a mixed bed may be required. In these cases, the particle size is part of a key parameter known as the terminal setting velocity ("TSV"). The cation resin TSV may be mutually exclusive of the anion resin TSV. Complete separation of the two resins may provide complete, effective regeneration of each resin, without subsequent resin or chemical cross-contamination, which may impact the subsequent deionization system performance ("DI quality").

Resins that may be treated by the methods of this invention include cation resins, anion resins, or mixtures of cation and anion resins. Other resins that may be treated include resins that are inert to charged particles and act through other binding mechanisms such as van der Waals or hydrophobic interactions (an "inert resin"), or resins that may chemically react with the ions to bind them from solution. Of particular interest are the mixed resins, due to their flexibility and their ability to remove differently charged ions from solution, including salts such as sodium chloride, potassium chloride, sodium sulfate, or calcium chloride, etc., thereby maintaining the pH of the solution near neutral levels during the ion exchange process.

This invention also relates to a method of treating ion exchange resins. In some embodiments, this method may consist of treating an ion exchange resin by contacting the resin with a solution comprising an organic compound (an "organic solution") for a predetermined amount of time. In another embodiment, this method may consist of treating an ion exchange resin by contacting the resin with an organic solution until a specified residual TOC level has been reached. For example, the final TOC concentration achieved may be less than about 200 ppt, preferably less than about 100 ppt, more preferably less than about 30 ppt, or still more preferably, less than about 10 ppt. In yet another embodiment, this method may consist of treating an ion exchange resin by contacting the resin with an organic solution until a predetermined concentration of an ion is reached. For example, the resin may be contacted with an acid or a base solution until the concentration of sodium, iron, copper, lead, or aluminum ions within the resin decreases to below about 50 parts per million by wet weight (abbreviated herein as "ppm") or 10 ppm in some embodiments. In still another embodiment, this method may consist of treating an ion exchange resin by contacting the resin with an organic solution until a predetermined condition is reached. For example, the resin may be contacted with an organic solution until the concentration of an impurity within the resin has decreased by a certain amount, for example, by at least 75%, more preferably by at least 85%, or still more preferably by at least 95% of the original impurity concentration, or until a certain quantity of an internal metallorganic species has dissolved.

In another set of embodiments of the invention, this method may consist of treating an ion exchange resin by contacting the resin with an organic compound for a predetermined amount of time at a first concentration, for example, 5% by volume of the organic compound, and then treating the resin with the organic solution at a second concentration, for example, 25% by volume of the organic compound. The change from the first concentration to the second concentration may be achieved in any manner, for example, a step change or a gradual increase or decrease from the first concentration to the second concentration. The resin may be treated until a specified residual TOC level has been achieved, or until a predetermined concentration of an ion or another condition has been reached.

To remove adsorbed or other unnecessary substances from the resin, a compound may be used to contact with or rinse the resin. Examples of contacting may include spraying or immersing the resin with the compound. The compound may be any suitable compound that effectively removes these substances without damaging the resin, for example, by reacting with the resin or negatively altering its chemistry. The compound may also be low cost, non-toxic, readily obtainable, and easy to work with. For example, water may be a suitable compound. However, water that has not been sufficiently purified may not adequately remove adsorbed substances from the resin, as impurities dissolved in the water may unfavorably alter the desorption kinetics or provide new contaminants to the resin. Thus, in some embodiments, the use of filtered, distilled, or de-ionized water may be desirable. Particularly desirable is ultra-high purity water (e.g., water with a resistivity greater than 18 MΩ cm). Alternatively, various additives may be dissolved into water to increase the reaction rate, or alter the desorption kinetic properties of the resin. For example, the pH may be shifted by the addition of measured amounts of an acid or a base. In some embodiments, the compound may also be heated to increase the reaction kinetics. However, temperatures that are too high may adversely affect the resin, or result in the need for expensive processing equipment. A temperature range of between about 125° F. and 250° F. may be useful in balancing these concerns, and a temperature of between 165° F. and 195° F. may be particularly useful. It should be understood that these temperature ranges may vary, for example, with the particular resin being treated.

Substances adsorbed more firmly to or otherwise found on the resin may be removed using certain compounds that desorb, dissolve, displace, or otherwise remove materials from the resin. For example, substances more firmly adsorbed to the resin may include unreacted monomers in the case of polymer resins, residual organic solvents from the synthesis process, or metallorganic or other impurities within the resin. It is desirable that the compound used to remove these substances not react with the resin or any other materials in the ion exchanger or in the system. It is also desirable that the compound not affect the subsequent adsorption kinetics of the resins. Additionally, it is desired that the compound be low cost, relatively non-toxic, and easy to work with. In one set of embodiments, the compound is an organic compound, a mixture comprising organic compounds, or a solution comprising organic compounds, such as an alcohol solution, an amine solution, or an amide solution. As used herein, an "organic solution" is a solution comprising an organic compound able to dissociate adsorbed TOC extractable compounds from the ion exchange resin. Suitable organic solutions may comprise primary, secondary, tertiary, or quaternary amines, and particularly suitable are the primary amines. Particularly useful amines may include diethanolamine, methyl diethanolamine, diisopropanolamine, morpholine, aminopentanol, methoxypropylamine, aminobutanol, pyrrolidine, aminomethylpropanol, ethylenediamine, and especially ethanolamine, due to its widespread use as an anticorrosive and pH-buffering agent. Alternatively, the compound used to contact the resin may be a surfactant, such as sodium dodecyl sulfate, or the compound may be a carboxylic acid, such as acetic acid.

The resin may also be prepared or "conditioned" before use. Resins may be prepared to have an increased concentration of ions to deliver to solution, or an increased number of adsorption sites. The conditioning agent may be any substance capable of exchanging ions and other compounds with the resin, or removing ions and other compounds from the resin to increase the number of available binding sites. It is desirable for the conditioning agent to be low cost, easily obtainable, and simple to work with and prepare. In another embodiment, a strong acid or a strong base may be used to add hydrogen or hydroxide ions to the resin, respectively, as in the case of a water treatment process. Suitable strong acids may include mineral acids and mixtures comprising mineral acids, such as sulfuric acid, hydrochloric acid, or mixtures thereof. Sulfuric acid may be particularly suitable. Suitable strong bases may include mineral bases and mixtures comprising mineral bases, such as lithium hydroxide, sodium hydroxide, potassium hydroxide, or mixtures thereof.

Figure 1:
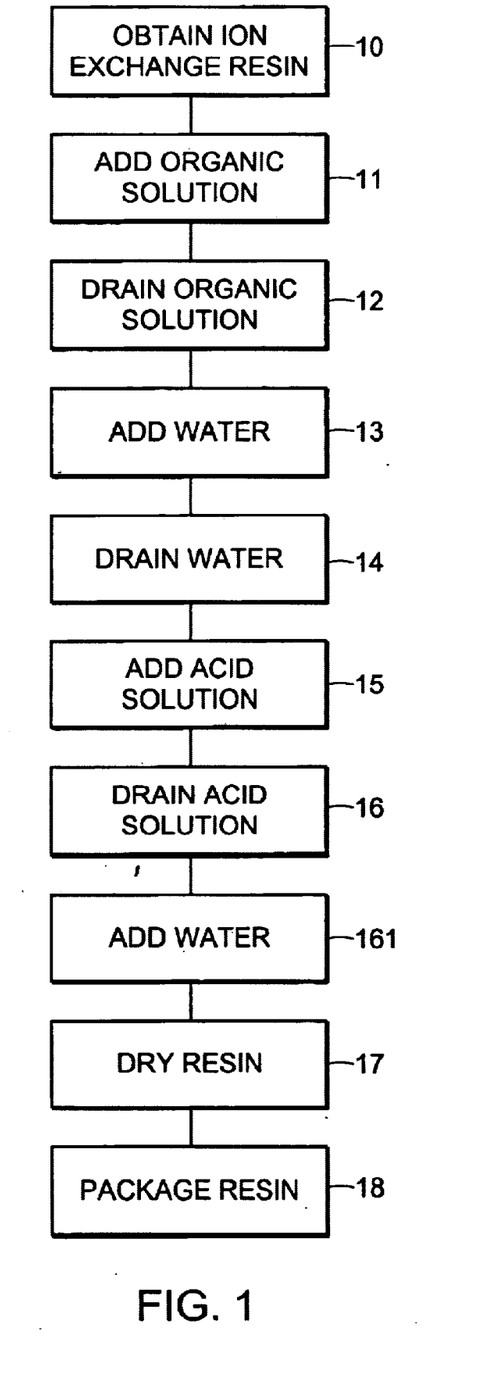
FIG. 1 is a flowchart of one embodiment of the invention.

FIG. 1 illustrates a general process flowchart of an example embodiment of this invention. An ion exchange resin is obtained 10 and is added to an organic solution 11. The organic solution may comprise an amine such as ethanolamine, diethanolamine, methyl diethanolamine, or diisopropanolamine. The resin remains in contact with the organic solution for a predetermined length of time, such as one hour. This time may be selected based upon the time needed for this volume of resin to reach a certain level of residual TOC contamination, such as 200 ppt. Next, the organic solution is removed from the resin, for example, by draining 12, and water is added to the resin 13. The water may be at room temperature or it may initially be preheated, such as to a temperature of 140° F., 150° F., or higher. The resin remains in contact with the heated water for a suitable length of time to remove any excess substances from the resin, such as one hour. Next, the water is drained 14 and a solution containing an acid is added 15. The solution may contain sulfuric acid or hydrochloric acid, for example. The resin remains in contact with the acid solution for a predetermined length of time, such as one hour, selected to fully condition the resin and load a suitable amount of $H^+$ onto the resin. Finally, the acid solution is drained 16 and the resin rinsed with water 161. The resin may then be partially dried 17 and packaged 18. It should be understood that this invention is not limited to the process illustrated in FIG. 1. In some embodiments, additional processing steps may be added to the invention and in other embodiments, the steps shown in FIG. 1 may be removed, rearranged, or combined with other steps. For example, the resins may be exposed to a second organic solution at a different concentration. The second organic solution may contain different organic compounds, or it may contain the same organic compounds as the first solution, but a different concentration. The second concentration may be higher or lower than the first concentration; for example, in one embodiment, the first concentration may be about 5% by volume and the second concentration may be about 25% by volume. The change between the first and the second concentration may be achieved by any suitable means, such as a rapid changeover from a solution at the first concentration to a solution at the second concentration, or by gradually altering the component ratios of the organic solution until the second concentration has been achieved. The component ratios may be altered, for example, by adding more organic compound to the resin, or by a chemical reaction.

In another set of embodiments, the present invention provides a method of maintaining an ion concentration in solution. A resin with a low level of TOC's is contacted with a solution. The solution may be, for example, water, such as water from a power plant. The water may also be from a nuclear power plant, a cooling system of a process, or a semiconductor manufacturing plant. Additional compounds may be present in the water as well, for example, ethanolamine buffer. Ions to be maintained at certain concentrations, for example, include sodium, chloride, sulfates, iron, copper, aluminum, or lead ions. The resin may be used to maintain ion concentrations in solution for a total period of usage greater than about three months, preferably five months, more preferably eight months, or still more preferably longer. The ion concentration in solution may be below about 10 parts per billion by wet weight (abbreviated herein as "ppb"), preferably below about 100 ppt, more preferably below about 1 ppt, or still more preferably below about 100 parts per quadrillion by wet weight (abbreviated herein as "ppq"). The resins may maintain the ion concentrations in solution at these levels due to the lack of TOC's that may interfere with ion exchange.

Figure 2:
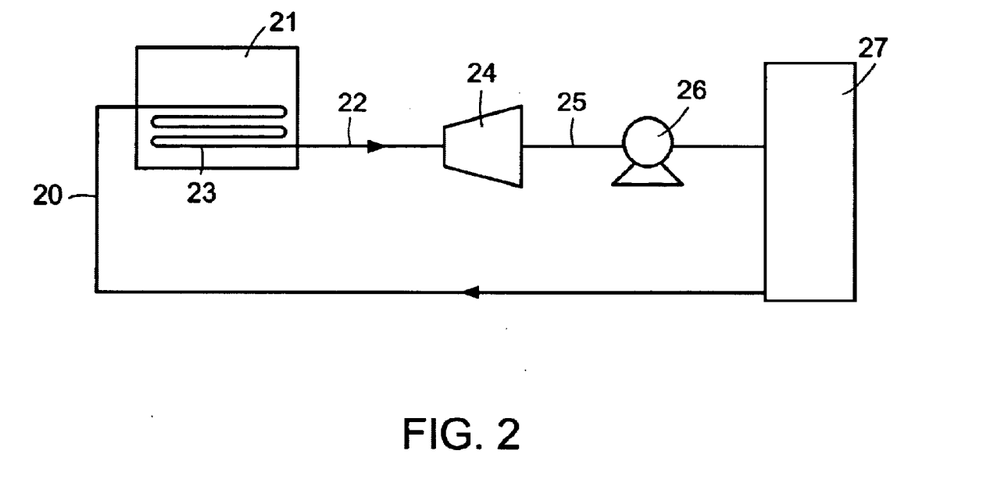
FIG. 2 is a schematic view of another embodiment of the invention.

In another embodiment, the resin may be used in an ion exchange column used within a power plant, as illustrated in FIG. 2. In the power plant, water 20 is brought to and heated within a reaction chamber 21, where the water is converted to steam 22 in a heat exchanger 23. Upon expansion through a turbine 24 used to generate electrical power, the steam condenses back into liquid water 25 and is pumped using a pump 26 through an ion exchange bed 27 to remove any ions that may be present. The size of the ion exchange bed may depend on the size of the reactor; an ion exchange bed in a typical power plant may contain, for example, several beds of resin, each with about 100 to 300 $ft^3$ of resin. Water from the ion exchange bed is then circulated back into the reactor. Aliquots of the water may be taken at regular intervals, such as, for example, after a total period of usage of 10 hours. The aliquots may be taken, for example, after the end of a condensate polishing (demineralizing) step (not shown). As used herein, the "total period of usage" refers to the total time of actual operation of the equipment, not including shut-down periods for maintenance, repairs, upgrades, and the like. The aliquots may then be analyzed using any suitable technique. For example, the TOC concentration in water may be measured with a GC/MS, a osmometer, a densitometer, or the like. Additionally, ion concentrations may be measured using a resistivity measurement, a spectrophotometric flame measurement, or any other suitable test. FIG. 2 illustrates one embodiment of the invention; other embodiments may also be envisioned. For example, the equipment may be rearranged or additional piping networks to process water (such as for cogeneration) may be added to the equipment shown in FIG. 2 without departing from the spirit of the invention.

It should be understood that the materials and methods of the present invention may be used in connection with any system where a treated ion exchange resin is desired. Consequently, those of ordinary skill in the art will readily envision a variety of other means and structures for performing the functions and/or obtaining the results or advantages described herein, and each of such variations or modifications is deemed to be within the scope of the present invention. For example, steps to soak or rinse the resins with various chemical solutions and treatments, or additional rinsing using water, such as high purity deionized water, may be contemplated without departing from the scope of the invention.

The function and advantages of these and other embodiments of the present invention will be more fully understood from the following examples. These examples are intended to be illustrative in nature and are not considered as limiting to the scope of the invention.

EXAMPLE 1

The methods of the present invention were used to demonstrate a significant reduction in TOC levels on an ion exchange resin. Cation exchange resins USF C-373 and USF C-375 were obtained from United States Filter Corporation (Palm Desert, Calif.). This cation exchange resin contained approximately 1 ppb of TOC, as determined by a gas chromatography/mass spectrometry test ("GC/MS"). A tank was initially loaded with about 140 $ft^3$ of the cation exchange resin. The resin was then warmed to a temperature of about 180° F., and submerged in high-purity deionized water for about an hour, also maintained at about 180° F. The volume of water in the tank was approximately 240 gallons. After about an hour, the water was displaced by fresh, high-purity deionized water at about 180° F., at a rate of about 60 gal/min. After complete displacement, fresh water at a temperature of about 180° F. was continuously flushed through the tank for about 1 hour, at the rate of about 60 gal/min. After about an hour, the remaining water was drained from the tank at a rate of about 60 gal/min and the resin was allowed to cool to ambient temperature. The draining process took about 30 minutes.

Next, the tank was refilled using a mixture of about 5% by volume of ethanolamine in water, by continuously flushing the tank with about 16 gal/min of high purity deionized water and about 0.8 gal/min of pure ethanolamine. The resin was soaked in this mixture for approximately 2 hours. The resin was then flushed in a mixture of about 20% by volume ethanolamine in water for approximately 2 hours, by increasing the pure ethanolamine feedstream to 1.3 gal/min and decreasing the high purity deionized water feedstream to about 5.2 gal/min.

The resin was then rinsed in fresh, high-purity deionized water for about 154 minutes, at about 10 gal/min. The tank was then drained and refilled using a combined mixture of about 6% by volume sulfuric acid in about 60 gal/min of high purity deionized water, and the resin was soaked in this mixture for about 134 minutes. During this step, after approximately 5000 gal of about 6% by volume sulfuric acid had passed through the resin bed (after approximately 83 minutes), with the drain of the tank open.

The resin was then rinsed in fresh high, high-purity deionized water at around 60 gal/min, until the effluent from the tank showed less than about 0.5 grains per gallon ("GPG") per methyl purple titration. The resin was then dried and packaged for later use.

Laboratory tests of the TOC of the resin after the treatment showed an approximately 85% reduction of the TOC levels in the resin to around 150 ppt, as demonstrated by the GC/MS test. The GC/MS experiments were carried out as follows. 5.00 g of each sample of resin was placed in a 5 ml screw-cap vial, and 3.00 g of methylene chloride was added to the vial. A solvent blank was prepared in the same fashion without inclusion of a resin. The vials were sealed with teflon-lined screw caps and the mixtures were then sonicated for about 1 hour in an ultrasonic cleaning bath. The resins were then allowed to soak for about 12 hours. The methylene chloride extracts were removed using glass Pasteur pipet, and placed in 3 ml conical bottom vials. The methylene chloride was evaporated at room temperature to a final volume of about 0.10 ml and the samples were analyzed by GC/MS. Compounds were identified by matching the mass spectra to the NIST database. Not all peaks could be identified in this manner since many fragments from ion-exchange resins have never been isolated and characterized. The amount of each material present was determined using docosane as an external standard. Retention times and compound identities are tabulated in Table 1. In Table 1, all numbers are given is ppt. Resin B is the treated resin, Resin C is the untreated resin, and Resin A is a resin partially treated with ethanolamine, but not water, according to one embodiment of the invention.

This example thus demonstrates the reduction in TOC levels that may be achievable with the present invention.

TABLE 1

| Compound | RT min | Resin A | Resin B | Resin C |
|---|---|---|---|---|
| Ethylbenzene | 6.8 | 8.7 | 4.7 | 8.0 |
| Styrene | 7.6 | 201 | 55 | 49 |
| Benzaldehyde | 9.6 | 7.6 | — | 9.2 |
| Mesitylene | 9.8 | — | 7.6 | — |

TABLE 1-continued

| Compound | RT min | Resin A | Resin B | Resin C |
|---|---|---|---|---|
| Unknown (alkylbenzene) | | — | — | 2.4 |
| 1-Ethyl-8-methylbenzene | 10.6 | 8.7 | 16.1 | 7.9 |
| 1,2,4-Trimethylbenzene | 11.5 | — | 4.6 | 0.04 |
| Unknown (alkane) | 11.9 | — | — | 6.1 |
| Unknown (alcohol) | 12.6 | — | — | 3.7 |
| Acetophenone | 12.8 | — | — | 71.2 |
| Unknown (alkyne) | 13.2 | — | — | 12.5 |
| 4-ethylvinylbenzene | 13.3 | 12.3 | 8.9 | 7.6 |
| 2,3,4-trimethyl-2-cyclopenteneone | 13.4 | — | — | 21.4 |
| Unknown (alkane) | 13.7 | — | — | 5.5 |
| Unknown (alkane) | 14.1 | 6.6 | — | 6.9 |
| Unknown (alkane) | 14.3 | 2.0 | — | — |
| Unknown (alkane) | 14.5 | 2.5 | — | 6.4 |
| Unknown (alkane) | 14.8 | 5.9 | — | 5.0 |
| Unknown (aromatic) | 15.2 | 1.8 | — | 5.8 |
| 1-Ethyl-3,5-dimethylbenzene | 15.5 | 3.5 | 3.8 | — |
| Benzoic Acid | 15.6 | — | — | 196.1 |
| Unknown (ketone) | 15.9 | 3.2 | — | — |
| Unknown (ketone) | 16.2 | — | — | 2.1 |
| Unknown (aromatic) | 16.3 | 3.5 | 0.8 | 4.5 |
| Unknown (phenol) | 16.4 | — | — | 3.7 |
| Unknown (aromatic) | 16.6 | — | — | 3.0 |
| Unknown (alcohol) | 16.8 | 3.1 | 1.6 | 9.3 |
| Unknown (alcohol) | 17.2 | 8.1 | 4.6 | 4.7 |
| Unknown (ketone) | 17.5 | — | — | 2.5 |
| 4-r-butylcyclohexanone | 17.7 | 1.9 | 4.6 | 4.7 |
| Unknown (ester) | 17.9 | — | — | 3.5 |
| Unknown (aromatic) | 18.1 | — | — | 8.8 |
| Unknown (ketone) | 18.3 | — | — | 22.6 |
| Unknown (aromatic) | 18.5 | 0.6 | — | — |
| 1-(4-Ethylphenyl) ethanone | 18.7 | 1.8 | 7.7 | 53.9 |
| Unknown (ketone) | 18.8 | — | — | 6.9 |
| Unknown (ketone) | 18.9 | — | — | 11.5 |
| Unknown (aromatic ketone) | 19.1 | — | — | 2.1 |
| Unknown (aromatic ketone) | 19.2 | — | — | 25.0 |
| Unknown (aromatic) | 19.3 | — | 3.3 | 16.0 |
| Unknown (aromatic) | 19.9 | — | — | 9.3 |
| 3,4-Dimethylphenyl-1-ethanone | 20.3 | — | 2.7 | 17.1 |
| Unknown (phenol) | 20.5 | — | — | 25.2 |
| Unknown (ketone) | 20.9 | — | — | 5.2 |
| Unknown | 21.3 | — | — | 3.0 |
| Unknown (alkene) | 21.8 | — | — | 9.9 |
| Unknown | 22.0 | — | — | 1.6 |
| Unknown (ketone) | 22.2 | — | — | 2.8 |
| Unknown (aromatic) | 22.4 | — | — | 5.9 |
| Unknown (alkane) | 22.5 | — | — | 6.0 |
| Unknown (aromatic) | 22.8 | — | 1.5 | 6.0 |
| 2-Methylvinylbenzene | 22.9 | — | — | 6.8 |
| Unknown (phenol) | 23.0 | — | — | 2.9 |
| Unknown (alkene) | 23.4 | — | — | 2.6 |
| Unknown | 23.5 | — | — | 5.0 |
| Unknown (alkene) | 23.8 | — | 1.5 | 6.6 |
| Dodecadenal | 23.9 | — | — | 1.5 |
| Unknown | 24.1 | 1.8 | — | — |
| Unknown (aromatic) | 24.6 | — | — | 3.8 |
| Unknown (aromatic) | 24.8 | — | — | 2.4 |
| 2-Ethyl-1,1-biphenyl | 24.9 | 1.1 | 1.2 | 4.8 |
| Unknown (aromatic) | 25.2 | — | 1.4 | 2.0 |
| Unknown (aromatic) | 25.8 | — | — | 1.1 |
| Unknown (aromatic ketone) | 26.0 | — | — | 4.6 |
| Unknown (aromatic) | 26.5 | — | 0.9 | — |
| Unknown (aromatic) | 26.9 | — | — | 1.7 |
| Unknown (aromatic) | 28.7 | — | — | 2.0 |
| Unknown (aromatic) | 28.8 | — | — | 1.3 |
| Tetradecanol | 28.9 | 2.5 | — | — |
| Unknown (aromatic) | 29.3 | 6.4 | — | — |
| Unknown (aromatic) | 29.4 | — | — | 2.6 |
| Unknown (aromatic) | 29.5 | 3.0 | 4.1 | 11.4 |
| Unknown (aromatic) | 29.6 | 12.3 | 6.7 | 13.7 |
| 2,3-Dihydro-1-methyl-3-phenyl-1H-indene | 30.0 | 10.8 | 5.6 | 11.0 |
| Unknown (aromatic) | 30.1 | — | — | 0.8 |
| Unknown (aromatic) | 30.2 | — | — | 1.2 |
| Unknown (alkene) | 30.8 | 4.5 | 3.9 | 3.0 |
| Unknown (aromatic) | 31.0 | — | 0.9 | 1.5 |
| Unknown (alkene) | 31.2 | 0.9 | 1.5 | 5.1 |

TABLE 1-continued

| Compound | RT min | Resin A | Resin B | Resin C |
|---|---|---|---|---|
| 1,1-(3-methyl-1-propene-1,3-diyl)bisbenzene | 31.5 | 17.0 | — | — |
| Unknown (aromatic) | 32.1 | — | 1.2 | — |
| Unknown (aromatic) | 32.8 | — | 2.1 | — |
| Unknown (aromatic) | 33.1 | — | — | 4.1 |
| Unknown (aromatic ketone) | 33.4 | — | — | 1.7 |
| Unknown | 33.6 | — | 1.1 | — |
| Unknown (aromatic) | 33.8 | — | 1.4 | — |
| Unknown (aromatic) | 33.9 | — | — | 2.5 |
| Unknown (aromatic) | 34.2 | — | 1.4 | 5.1 |
| Unknown (aromatic) | 34.5 | — | — | 2.6 |
| Unknown (aromatic) | 34.8 | 3.3 | 1.5 | 7.7 |
| Unknown (aromatic ketone) | 35.0 | — | — | 5.1 |
| Unknown (aromatic) | 35.8 | — | 1.8 | — |
| Unknown (aromatic) | 36.1 | — | — | 10.3 |
| Unknown (aromatic) | 36.2 | 2.1 | 6.8 | 28.3 |
| Unknown (aromatic) | 36.4 | — | — | 0.8 |
| Unknown (aromatic) | 36.6 | — | — | 7.3 |
| Unknown (aromatic) | 36.8 | 1.1 | 4.0 | 15.1 |
| Unknown (aromatic) | 37.1 | — | 2.3 | 3.2 |
| Unknown (alkane) | 37.3 | 1.4 | — | — |
| Unknown (aromatic) | 37.9 | — | — | 4.2 |
| Unknown (aromatic) | 38.2 | — | — | 3.1 |
| Thioxanphone | 38.4 | 20.3 | 14.1 | 24.1 |
| Unknown (aromatic) | 38.8 | — | — | 1.6 |
| Unknown (aromatic) | 39.0 | 2.3 | — | — |
| Unknown (aromatic) | 40.4 | 1.6 | 3.0 | 4.9 |
| Unknown (aromatic) | 40.7 | — | 2.4 | 2.8 |
| Unknown (aromatic) | 41.9 | 1.6 | — | — |
| Unknown (aromatic) | 43.2 | 2.4 | 5.6 | 4.7 |
| Unknown (aromatic) | 43.4 | 2.3 | — | — |
| Unknown (aromatic) | 43.7 | 7.7 | 3.3 | 4.9 |
| Unknown (aromatic) | 44.2 | 4.1 | 8.8 | 4.8 |
| Unknown (aromatic) | 44.4 | 8.9 | 16.6 | 17.3 |
| Unknown (aromatic) | 45.4 | — | — | 2.2 |
| Unknown (aromatic) | 45.8 | — | 5.7 | 9.9 |
| Unknown (alkane) | 46.4 | — | — | 1.5 |

EXAMPLE 2

To demonstrate the significantly improved adsorption ability of the resin of the present invention in environments comprising ethanolamine, the resins were compared to conventional ion exchange resins. This example also illustrates the ability of this invention to be used to maintain ion concentrations below acceptable limits for extended periods of time. Here, an embodiment of this invention was used to maintain the sulfate concentration of the water used in a nuclear power plant to below about 5 ppb for more than about 8 months.

A nuclear power plant had several pressurized water reactors for cooling equipment within the power plant. Hydrazine, ammonia, and various amines were typically added to the water to control the pH and prevent corrosion of the equipment. Recently, ethanolamine was identified as a potent anti-corrosive and buffering agent. Workers within the plant began to add ethanolamine to the water in small concentrations, typically around a few ppm, to help prevent equipment corrosion problems.

The ion exchange beds within the pressurized water reactor each contained approximately 300 ft$^3$ of mixed resin, comprising roughly 175 ft$^3$ of cation resin and roughly 125 ft$^3$ of anion resin. Water was pumped across the ion exchange beds at about 2500 gal/min. The recent addition of ethanolamine to water was found to have an adverse effect on the ion exchange resins. Specifically, the resins were not able to effectively control the sulfate ion concentration levels in the water to below the required ppb levels for more than around 4 to 6 weeks. The resins were monitored on at least a daily basis, and sometimes more frequently. The resins were monitored using sulfate ion measurements measured by ion chromatography. TOC's present on the anion resins indirectly increase the sulfate ion levels; sulfate ion levels are thus proportional to the TOC concentration. Water within the plant required continual monitoring, and the ion exchange beds needed frequent replacement in order to maintain safe ion concentrations within the power plant.

The resins within the ion exchange columns of the power plant were removed and replaced by the resins of this invention. The resins were monitored by measuring sulfate ion concentrations on at least a daily basis, as described above. It was found that the resins maintained the concentration of sulfate ions in the cooling water below the 5 ppb limit for a total period of usage of approximately 9 months. The frequency of shutdowns within the power plant to replace the ion exchange resins was significantly reduced. The resins of this invention did not require frequent regeneration or replacement, thus demonstrating the improved performance of this invention in an environment comprising ethanolamine, and the ability of this invention to be used to maintain ion concentrations in solution below acceptable levels for extended periods of time.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A method of treating an ion exchange resin material, comprising:
   providing the ion exchange resin material; and
   contacting the ion exchange resin material with solution consisting essentially of water and an amine to produce an ion exchange resin material with less than about 200 ppt of TOC extractables as determined by a GC/MS test.

2. The method of treating an ion exchange resin material of claim 1, wherein contacting the ion exchange resin material with a solution consisting essentially of water and an amine produces an ion exchange resin material with less than about 100 ppt of TOC extractables.

3. The method of treating an ion exchange resin material of claim 2, wherein contacting the ion exchange resin material with solution consisting essentially of water and an amine produces an ion exchange resin material with less than about 30 ppt of TOC extractables.

4. The method of treating an ion exchange resin material of claim 3, wherein contacting the ion exchange resin material with solution consisting essentially of water and an amine produces an ion exchange resin material with less than about 10 ppt of TOC extractables.

5. The method of treating an ion exchange resin material of claim 1, wherein the amine comprises a primary amine.

6. The method of treating an ion exchange resin material of claim 1, wherein the amine comprises at least one selected from a group consisting of diethanolamine, methyl diethanolamine, diisopropanolamine, morpholine, aminopentanol, methoxypropylamine, aminobutanol, pyrrolidine, aminomethylpropanol, and ethylenediamine and mixtures thereof.

7. The method of treating an ion exchange resin material of claim 5, wherein the primary amine comprises ethanolamine.

8. The method of treating an ion exchange resin material of claim 1, further comprising contacting the ion exchange resin material with a solution comprising an acid.

9. The method of treating an ion exchange resin material of claim 8, wherein contacting the ion exchange resin material with a solution comprising an acid comprises contacting the ion exchange resin material with a solution comprising a mineral acid.

10. The method of treating an ion exchange resin material of claim 9, wherein contacting the ion exchange resin material with a solution comprising a mineral acid comprises contacting the ion exchange resin material with a solution comprising sulfuric acid.

11. The method of treating an ion exchange resin material of claim 1, further comprising contacting the ion exchange resin material with a solution comprising a base.

12. The method of treating an ion exchange resin material of claim 1, further comprising contacting the ion exchange resin material with water.

13. The method of treating an ion exchange resin material of claim 12, wherein contacting the ion exchange resin material with water comprises contacting the ion exchange resin material with water at a temperature greater than about 130° F.

14. A method of treating an ion exchange resin material, comprising:
providing the ion exchange resin material;
contacting the ion exchange resin material with a solution comprising a first concentration of an amine; and
contacting the ion exchange resin material with a solution comprising a second concentration of an amine.

15. The method of treating an ion exchange resin material of claim 14, wherein contacting the ion exchange resin material with a solution comprising a first concentration of an amine comprises contacting the ion exchange resin material with a solution comprising a first concentration of ethanolamine.

16. The method of treating an ion exchange resin material of claim 14, further comprising contacting the ion exchange resin material with a solution comprising a mineral acid.

17. A method of treating an ion exchange resin material, comprising:
providing the ion exchange resin material;
contacting the ion exchange resin material with water at a temperature greater than about 130° F.;
contacting the ion exchange resin material with a solution comprising ethanolamine; and
contacting the ion exchange resin material to a solution comprising a mineral acid.

18. The method of claim 1, wherein the ion exchange resin material is an anion exchange resin material.

19. The method of claim 14, wherein the ion exchange resin material is an anion exchange resin material.

20. The method of claim 17, wherein the ion exchange resin material is an anion exchange resin material.

* * * * *